Feb. 12, 1946.     D. L. HILL     2,394,771
IMPLEMENT FOR SOIL PREPARATION
Filed April 14, 1944
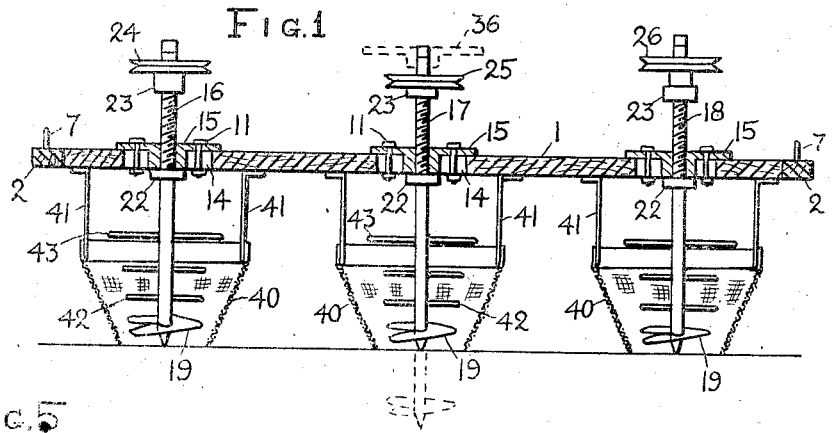
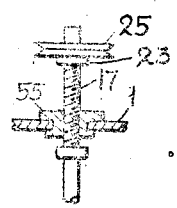
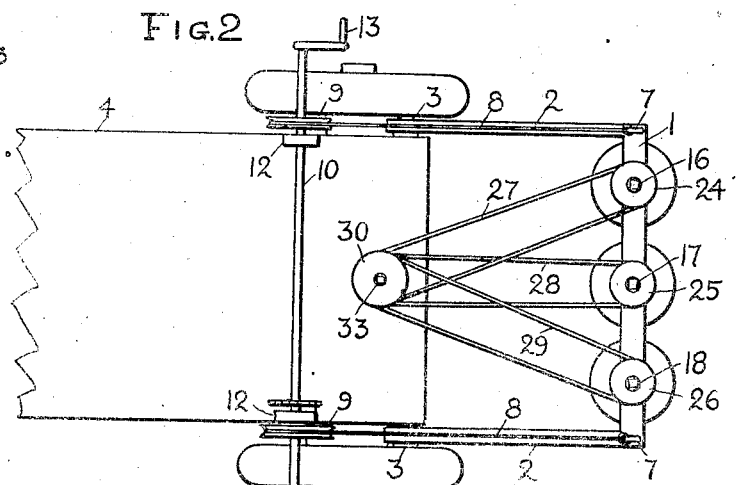
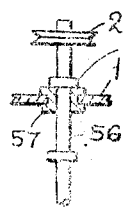
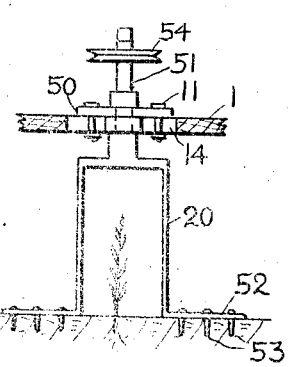
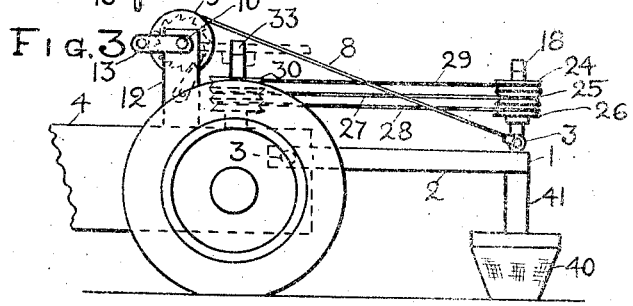
DUDLEY L. HILL
INVENTOR
John P. Nikonow
ATTORNEY Patented Feb. 12, 1946

2,394,771

UNITED STATES PATENT OFFICE 2,394,771

IMPLEMENT FOR SOIL PREPARATION

Dudley L. Hill, Peekskill, N. Y.

Application April 14, 1944, Serial No. 530,969

4 Claims. (Cl. 97—43)

My invention relates to implements for soil preparation and has particular reference to gardening or agricultural implements for the preparation of soil prior to planting of seeds or plants.

In my patent application, Serial No. 521,925, filed February 11, 1944, I disclosed an implement for soil preparation especially suitable for manual operation, for the preparation of one planting hole at a time. Under certain conditions, however, it is desirable to prepare the soil on a larger scale, using a power driven implement.

My invention has therefore for its object to provide a machine which can be used for the simultaneous preparation of several planting holes, spaced apart at a definite distance. I provide for this purpose a frame, hingedly connected to a vehicle such as a tractor, truck or wagon, means being also provided to lower the frame into an operative position over a ground in which it is desired to bore planting holes. The frame is provided with a plurality of rotatively supported augers and cages or baskets surrounding the augers for the earth, raised or conveyed by the augers.

Another object of my invention is to provide means to operate the auger by a suitable power take-off on the truck or tractor to which the implement is attached, with a further provision manually to operate the augers if the power is unavailable.

Another object of my invention is to provide earth boring units in my implement, each unit being adapted to breaking up of the earth lumps in the boring hole and, also for preparing a finer comminuted soil for filling the upper portion of the hole after planting.

Still another object of my invention is to provide means to cultivate the plants when they begin to grow from the seeds.

My invention is more fully described in the accompanying specification and drawing in which—

Fig. 1 is a sectional elevational view of the portion of my attachment with power driven augers;

Fig. 2 is a top plan view of the same on a reduced scale, showing also a portion of the power operated vehicle;

Fig. 3 is an elevational view of the same;

Fig. 4 is a sectional view of a cultivator used with my implement;

Figs. 5 and 6 are fractional detail views of modified devices.

My implement for soil preparation consists of a frame having a horizontal front bar 1 and side bars 2, rigidly connected with the bar 1. The inner ends of the side bars are pivoted at 3 to the sides of a vehicle 4, preferably power operated such as a tractor or truck, with a power take-off vertical shaft 33, the power take-off may be of a conventional type, connected with the reversible transmission of the vehicle 4. The front bar 1 is provided with eye bolts 7 at the ends for cables 8 passing over sheaves 9 on a shaft 10. The shaft is journaled in bearing brackets 12 at the sides of the vehicle 4, the ends of the shaft being provided with handles 13 for its manual operation. By turning the handles, it is possible to raise or to lower the bar 1 for placing the implement into an operative or inoperative position.

The bar is provided with elongated slots 14 to which are fastened bearings 15 by bolts 11 threaded inside for threaded shafts 16, 17, 18 supporting augers 19 at the lower ends. Collars 22, 23 limit the vertical movement of the shafts in the threaded bearing or nuts 15, causing the shafts to be stopped in the extreme up or down positions. The slots 14 make possible adjustment of the shafts for different spacing between the plants.

Pulleys 24, 25, 26 are mounted on the upper ends of the shafts for belts (preferably of a V-type) 27, 28, 29, extending to corresponding pulleys 30 on a shaft 33 of a power takeoff. The pulleys are staggered in the vertical direction so that the belts do not interfere with each other. The upper ends of the auger shafts are provided with squares for removable handles 36, shown in dotted lines in Fig. 1, which are used if the power is not available.

Each auger is surrounded by a basket 40, made of wire mesh or perforated sheet metal, supported on bars or brackets 41 attached to the bar 1. The basket is of a tapering or frusto-conical shape, the narrow lower end of the basket resting on the ground when the bar 1 is lowered into its operative position.

The shaft above the auger is provided with radially extending knives 42 for breaking up the soil, raised by the auger. The knives are preferably given a certain pitch for helping to raise the soil, removed by the auger. The length of the knives is determined by the diameter of the basket at its lower end. Longer knives 43 may be provided on the upper portion of the shaft which does not reach the narrow portion of the basket.

The soil, raised by the auger, is crushed by the knives, breaking the lumps and cutting roots of the weeds. Finer soil particles are sieved through the mesh of the wire basket to the outside, gathering around the basket. This sieved soil is later used to cover the hole at the top, after the seeds have been planted and covered with a coarser broken up soil.

The augers are used for preparing holes for planting seeds. My implement can be also used for cultivating small plants for which purpose the threaded bearings 40 are replaced by plain bearings 50, Fig. 4, for smooth shafts 51, with forms 20 supporting cultivating rakes 52 at the lower ends. The rakes are made of horizontal bars with holes into which knives 53 are fitted. The shafts are rotated by pulleys 54 in the same manner as the augers of Fig. 1.

A modified arrangement is shown in Fig. 5 in which the threaded shaft 17 engages a threaded nut 55 frictionally fitted in the bar 1. The friction between the nut and the bar 1 retains the nut in place when the auger is being operated, but the nut rotates in its seat when the upper collar 23 reaches the end of the travel, and the auger is turned merely to crush and grind the removed soil.

Another modification is shown in Fig. 6, the auger having a smooth shaft 56 rotating in a bearing 57. The auger is advanced into the soil by the action of its screw-shaped blades.

It is understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. An implement for soil preparation comprising a bar; extensions at the ends of the bar; means to pivotally support the ends of the extensions on a vehicle; vertical shafts rotatively supported on the bar; augers at the lower ends of the shafts; power operated flexible drive means on the vehicle connected to the vertical shafts for effecting simultaneous rotation thereof; and tubular members enclosing the augers supported on the front bar and extending to the ground for supporting the bar; the tubular members being made of wire mesh for sieving the soil raised by the augers.

2. An implement for soil preparation comprising a bar; extensions at the ends of the bar; means to support the ends of the extensions on a vehicle; vertical shafts supported on the bar for rotary and axial movements; augers at the lower ends of the shafts; means on the vehicle for simultaneous rotation of the shafts; and tubular members enclosing the augers supported on the front bar extending from the bar to the ground for supporting the bar on the ground at a constant elevation.

3. An implement for soil preparation comprising a vehicle; a horizontal bar; means to support the bar on the vehicle; a plurality of vertical shafts in threaded engagement with the bar; augers at the lower ends of the shafts; and means on the vehicle for rotating the shafts with the augers for causing the shafts to move axially.

4. An implement for soil preparation comprising a vehicle; a horizontal bar; means to pivotally support the bar on the vehicle; a plurality of vertical shafts in threaded engagement with the bar; augers at the lower ends of the shafts; means on the vehicle for rotating the shafts, thereby moving axially the augers; a plurality of knives radially extending from the shafts for crushing the soil raised by the augers; and tubular members supported on the bar concentrically with the shafts and extending to the ground for receiving the soil raised by the augers, the lower portions of the tubular members having a plurality of apertures for sieving the soil to the outside of the tubular member.

DUDLEY L. HILL.